UNITED STATES PATENT OFFICE.

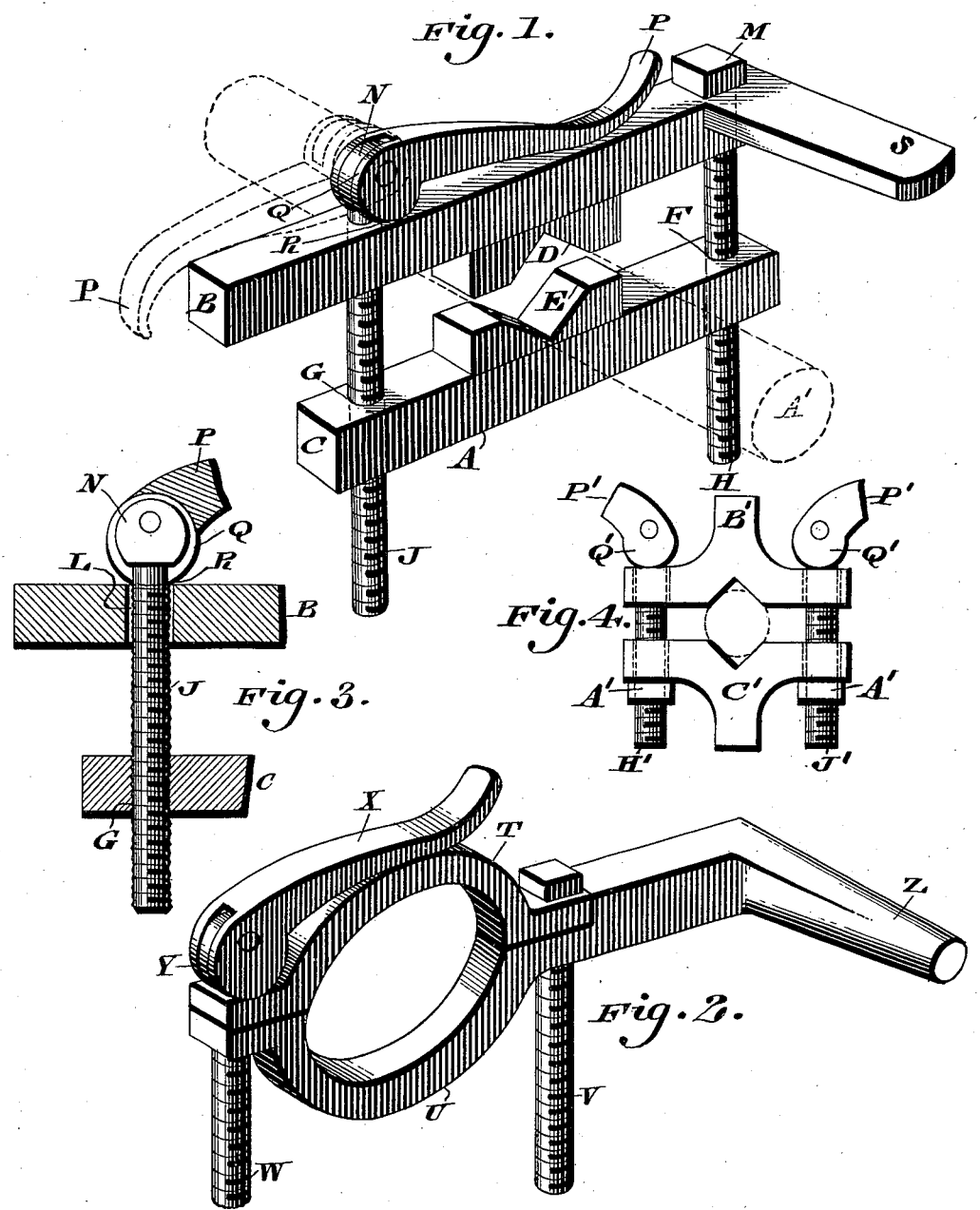

GEORGE R. G. WREN, OF PHILADELPHIA, PENNSYLVANIA.

LATHE-DOG.

SPECIFICATION forming part of Letters Patent No. 590,605, dated September 28, 1897.

Application filed December 13, 1895. Serial No. 572,021. (No model.)

*To all whom it may concern:*

Be it known that I, GEORGE R. G. WREN, a citizen of the United States, residing in the city and county of Philadelphia, State of Pennsylvania, have invented a new and useful Improvement in Lathe-Dogs, which improvement is fully set forth in the following specification and accompanying drawings.

My invention consists of a novel construction of a lathe-dog, in which provision is made for readily adjusting the same to work on material of different sizes without necessitating the employment of a wrench, as heretofore, the adjustment of the sections of the dog being effected by proper manipulation of a suitable screw, after which, by the employment of a cam, the dog is rigidly attached to the work to be acted upon.

It further consists of novel details of construction, all as will be hereinafter set forth.

Figure 1 represents a perspective view of a lathe-dog embodying my invention. Fig. 2 represents a perspective view of a modified form of the dog. Fig. 3 represents a sectional view to be hereinafter referred to. Fig. 4 represents a side elevation of a modification.

Similar letters of reference indicate corresponding parts in the several figures.

Referring to the drawings, A designates a lathe-dog complete, the same consisting of the bars or sections B and C, which may have a portion of their abutting faces raised and provided with the jaws D and E, which may be of angular, diamond, or other shape in order to positively and rigidly hold in position the work to be turned.

F and G designate internally-threaded holes near the ends of said bar C, which are engaged by the threaded bolt and stem H and J, respectively, the same passing freely through openings in the bar B, which are in alinement with the holes F and G and are of larger diameter than the said holes, as indicated at L in Fig. 3.

The head M of the bolt H may be milled, if desired, so as to be readily manipulated.

The head N or upper extremity of the stud J has pivotally mounted thereon the bifurcated cam Q, which has an arm or handle P attached thereto, said cam being adapted to contact with the face R of the bar or section B, as will be evident.

S designates the tail of the dog, which may be attached to either of the sections B or C, preferably at an angle thereto, and is adapted to contact with the face-plate, spider, or other portion of the lathe.

In Fig. 2 the construction is substantially the same as that already described, T and U designating the sections of the dog, which are held in place by means of the threaded bolt and stud V and W, respectively, the said stud W having pivotally attached thereto the cam device Y, to which the handle or arm X is attached, the said dog being provided with a tail Z, as is usual.

The operation is as follows: When it is desired to apply the dog to the work, the former is adjusted by turning the cam device to the left of the position seen in full lines in Fig. 1 into the position seen dotted. The bolt H, by means of the head M, is rotated with the fingers until the space between the jaws D and E is open to the desired extent, and the work having been placed therein and the bolt H turned with the fingers until the jaws are brought together in contact with the work to the required degree it is only necessary to rotate the stud J to the desired amount and then turn the handle or arm P into the position seen in full lines again, whereupon the dog and the work are rigidly held as one, and the tail S can be inserted into contact with the face-plate, spider, or other revolving portion of the lathe, as is customary.

Especial emphasis is laid upon the fact that by the employment of the cam Q and the bolt and stud in the manner described all necessity for the employment of a wrench is obviated and the dog can be more quickly and effectively applied to different sizes of work than heretofore, where the adjustment has been altogether by means of bolts or set-screws, which have to be actuated by a wrench.

As shown in Fig. 4, if desired, the bolts or stems H' and J' may pass freely through openings in the bars or sections B' and C', the ends of said bolts being threaded and adapted to receive nuts A', and the opposite ends of each bolt having a cam Q' and handle P' attached thereto, so that the nuts may first be tightened with the fingers, after which the cams are operated to rigidly hold the work.

Having thus described my invention, what

I claim as new, and desire to secure by Letters Patent, is—

1. A lathe-dog formed of two sections, bolts freely passing through openings in one of said sections, and engaging in threaded openings in the other section, a cam-lever pivotally attached to one of said bolts, and adapted to bear against one of said sections, and an arm extending at substantially a right angle from one of said sections.

2. A lathe-dog formed of two sections, each provided with a gripping-jaw, bolts freely passing through openings in one of said sections and engaging in threaded openings in the other section, a cam-lever pivoted to a head on one of said bolts and adapted to bear against one of said sections, an arm extending at substantially a right angle from one of said sections, and said gripping-jaws being intermediate of said bolts.

GEORGE R. G. WREN.

Witnesses:
WILLIAM ERTEL,
ROBERT M. MCKEE.